E. F. MULKEY & J. CASE.
Improvement in Bee-Hives.
No. 130,933.　　　　　　　　　　　　Patented Aug. 27, 1872.
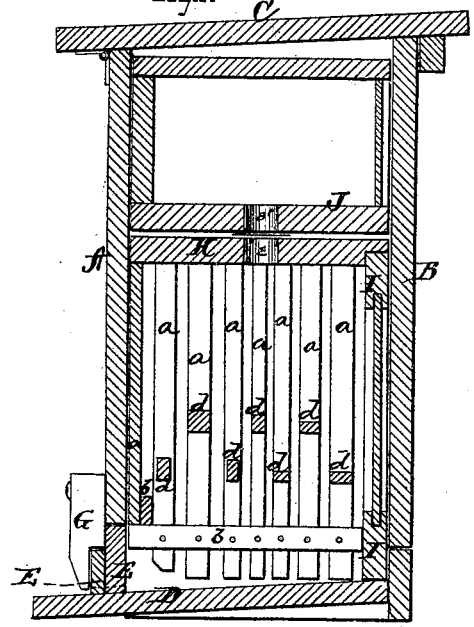
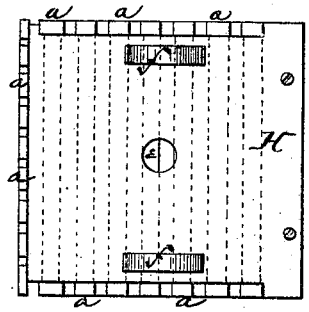
Witnesses:　　　　　　　　　　　　　　Inventor.
Jas. O. Hutchinson　　　　　　　　　Elijah F. Mulkey,
C. L. Evert.　　　　　　　　　　　　　James Case
　　　　　　　　　　　　　　　per Alexander Mason
　　　　　　　　　　　　　　　　　　Attorneys.

UNITED STATES PATENT OFFICE.

ELIJAH F. MULKEY AND JAMES CASE, OF TAMAROA, ILLINOIS.

IMPROVEMENT IN BEE-HIVES.

Specification forming part of Letters Patent No. 130,933, dated August 27, 1872.

*To all whom it may concern:*

Be it known that we, ELIJAH F. MULKEY and JAMES CASE, of Tamaroa, in the county of Perry and in the State of Illinois, have invented certain new and useful Improvements in Bee-Hive; and do hereby declare that the following is a full, clear, and exact description thereof, reference being had to the accompanying drawing and to the letters of reference marked thereon making a part of this specification.

The nature of our invention consists in the construction and arrangement of a bee-hive, as will be hereinafter more fully set forth.

In order to enable others skilled in the art to which our invention appertains to make and use the same, we will now proceed to describe its construction and operation, referring to the annexed drawing, in which—

Figure 1 is a longitudinal vertical section of my bee-hive, and Fig. 2 is a plan view of the brood-chamber.

A represents the body of the hive of any suitable dimensions, provided with a door, B, on the rear side. The top C of the hive is also hinged at the front edge, as shown, said top being inclined forward so as to allow the rain, &c., to run off. The bottom D of the hive is also inclined forward and extends in front for a short distance, as shown in Fig. 1. At the lower end of the front side of the hive are two movable bars, E E, held by a button, G, and provided with apertures, which bars may be moved or adjusted so as to adjust the entrances for the bees or close them up altogether. The brood-chamber is formed in the following manner: H is a board of such size as to fit within the hive, and in the front and side edges of said board are let in slats or strips $a\,a$, which depend perpendicularly downward, and have cleats $b$ secured near their lower ends across them, as shown. The side slats are also connected by bars $d\,d$, running from side to side at different distances from the top, as shown in Fig. 1. To the rear edge of the board H is secured a sash, I, with glass, which completes the interior structure. In the center of the board H is an aperture, $e$, corresponding with a similar opening, $e'$, in the bottom of the honey-box J, which is placed above. The board H is also provided with straps or handles $ff$ on top. By closing the apertures or entrances at the bottom of the hive by sliding the pieces E E under the button G the bees are confined in the hive. Now open the doors and the bees may be seen. Lift the honey-box off and stop up the opening $e$, then close the door B and take hold of the straps $ff$, when the whole interior structure may be raised up until the slats on the back of the frame come up even with the top of the hive. Now the bees and honey may be seen, and if there are any moth in the hive they will be in the spaces between the slats, and can be readily picked out. If it is desired to take any honey out of the brood-chamber the bees, after the frame has been raised, may be smoked down into the hive and the top of the same closed. The bees are now in the hive and the honey in the frames. The sash I can now readily be taken out and the honey removed, when the sash is put back in its place and the whole frame ready to go back in the hive.

Having thus fully described our invention, what we claim as new, and desire to secure by Letters Patent, is—

The interior frame, consisting of the board H, slats $a\,a$ with cleats or bars $b\,b$ and $d\,d$, and the sash I, all substantially as herein set forth.

In testimony that we claim the foregoing we have hereunto set our hands this 15th day of June, 1872.

ELIJAH F. MULKEY.
    JAMES CASE.

Witnesses:
 ROBT. W. DE VINNY,
 C. F. SPILMAN.